(12) United States Patent
Yu

(10) Patent No.: US 8,634,317 B1
(45) Date of Patent: Jan. 21, 2014

(54) METHOD AND APPARATUS FOR DETECTING PACKETS

(75) Inventor: Mao Yu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 150 days.

(21) Appl. No.: 13/103,632

(22) Filed: May 9, 2011

Related U.S. Application Data

(60) Provisional application No. 61/347,939, filed on May 25, 2010.

(51) Int. Cl.
*H04L 1/16* (2006.01)
*H04L 12/56* (2011.01)

(52) U.S. Cl.
CPC .................................. *H04L 47/10* (2013.01)
USPC .......................................... 370/252; 370/338

(58) Field of Classification Search
USPC ................... 370/241–252, 310–350
See application file for complete search history.

(56) References Cited

U.S. PATENT DOCUMENTS

| | | | |
|---|---|---|---|
| 5,613,194 A | 3/1997 | Olds et al. | |
| 6,169,761 B1 | 1/2001 | Marcoccia et al. | |
| 8,050,200 B2 | 11/2011 | Goel et al. | |
| 8,345,584 B2 | 1/2013 | Rohfleisch et al. | |
| 2006/0146869 A1 | 7/2006 | Zhang et al. | |
| 2006/0217125 A1 | 9/2006 | Miyazaki | |
| 2006/0268760 A1 | 11/2006 | Fang et al. | |
| 2007/0008884 A1 | 1/2007 | Tang | |
| 2007/0060155 A1 | 3/2007 | Kahana et al. | |
| 2007/0070922 A1 | 3/2007 | Benveniste | |
| 2008/0080553 A1 | 4/2008 | Hasty et al. | |
| 2008/0112340 A1 | 5/2008 | Luebke | |
| 2008/0192644 A1* | 8/2008 | Utsunomiya et al. | 370/252 |
| 2009/0059877 A1 | 3/2009 | Utsunomiya et al. | |
| 2009/0067403 A1 | 3/2009 | Chan et al. | |
| 2009/0285116 A1 | 11/2009 | Nanda et al. | |
| 2010/0142468 A1 | 6/2010 | Cheong et al. | |
| 2011/0194542 A1 | 8/2011 | Kim et al. | |
| 2011/0305288 A1 | 12/2011 | Liu et al. | |
| 2011/0310930 A1 | 12/2011 | Gerhardt et al. | |
| 2012/0057534 A1 | 3/2012 | Park | |
| 2012/0082056 A1 | 4/2012 | Horisaki et al. | |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

(Continued)

*Primary Examiner* — Kan Yuen

(57) ABSTRACT

In a method for detecting a duplicate packet in a signal, the signal is received using a receiver. Carrier sense (CS) operations are performed on the received signal in at least each of two frequency bands. Clear channel assessment (CCA) operations are performed on the received signal in the at least each of two frequency bands. A determination whether the received signal corresponds to a packet duplicated in the at least two frequency bands is made based on the CS operations and the CCA operations.

17 Claims, 5 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

International Standard, ISO/IEC 8802-11, ANSI/IEEE Std 802.11, "Information technology—Telecommunications and information exchange between systems—local and metropolitan area networks-specific requirements" Part 11: Wireless LAN Medium Access Control (MAC) and Physical Layer (PHY) specifications, *The Institute of Electrical and Electronics Engineers, Inc.*, (1999).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

Yuan, et al., "Carrier Aggregation for LTE-Advanced Mobile Communication Systems," IEEE Communications Magazine, pp. 88-93, Feb. 2010.

Cariou, et al., "Multi-channel Transmissions," Doc. No. IEEE 802.11-09/1022r0, *The Institute of Electrical and Electronics Engineers, Inc.*, Sep. 2009.

Noh, et al., "Channel Selection and Management for 11 ac," Doc. No. IEEE 802.11-10/0593r1, *The Institute of Electrical and Electronics Engineers, Inc.*, May 20, 2010.

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11 n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

U.S. Appl. No. 13/034,409, Liu et al., filed Feb. 24, 2011.

U.S. Appl. No. 13/034,421, Liu et al., filed Feb. 24, 2011.

Park, "IEEE 802.11ac: Dynamic Bandwidth Channel Access," 2011 Int'l Conf. on Communications (ICC), pp. 1-5, 2011.

Redieteab, et al., "Cross-Layer Multichannel Aggregation for Future WLAN Systems," 2010 IEEE Int'l Conf. on Communication Systems (ICCS), pp. 740-745, Nov. 2010.

Zhang et al., "11 ac Explicit Sounding and Feedback", *The Institute of Electrical and Electronics Engineers*, doc. No. IEEE 802.11-10/1105r0, (Sep. 2010).

Stacey et al., "Specification Framework for TGac," document No. IEEE 802.11-09/0992r20, Institute for Electrical and Electronics Engineers, pp. 1-49, Jan. 18, 2011.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," The Institute of Electrical and Electronics Engineers, Inc., (1999).

"IEEE Std. 802.11™ 1m IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

\* cited by examiner

METHOD AND APPARATUS FOR DETECTING PACKETS

CROSS-REFERENCES TO RELATED APPLICATION

The present application claims the benefit of U.S. Provisional Patent Application No. 61/347,939, filed on May 25, 2010, which is hereby incorporated by reference herein in its entirety.

FIELD OF TECHNOLOGY

The present disclosure relates generally to OFDM-based communication systems and, more particularly, to detection of packets transmitted via a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Newer protocols are often backwards compatible with older protocols, to an extent, so that devices operating according to a newer protocol can communicate with devices operating according to an older protocol.

SUMMARY

In an embodiment, a method for detecting a duplicate packet in a signal comprises receiving the signal using a receiver. The method also comprises performing carrier sense (CS) operations on the received signal in at least each of two frequency bands and performing clear channel assessment (CCA) operations on the received signals in the at least each of two frequency bands. Additionally, the method comprises determining whether the received signal corresponds to a packet duplicated in the at least two frequency bands based on the CS operations and the CCA operations.

In another embodiment, an apparatus for detecting a duplicate packet in a signal comprises a carrier sense (CS) packet assessment processor to analyze the received signal in at least each of two frequency bands and a clear channel assessment (CCA) processor to analyze the received signal in the at least each of two frequency bands. The apparatus additionally comprises logic configured to determine whether the received signal corresponds to a packet duplicated in the at least two frequency bands based on the outputs generated by the CS packet assessment processor and the outputs generated by the CCA packet assessment processor.

DETAILED DESCRIPTION

In embodiments described below, a wireless network device such as access point (AP) and client devices of a wireless local area network (WLAN) transmit packets between the AP and the client devices via a communication channel. In some of the scenarios, devices in the WLAN utilize a communication channel having first bandwidth, such as a bandwidth of 20 MHz or another suitable bandwidth. In other scenarios, devices in the WLAN utilize a communication channel having second bandwidth wider than the first bandwidth, such as a bandwidth of 40 MHz, 80 MHz, 120 MHz, 160 MHz, or another suitable bandwidth. In an embodiment, one or more of the network devices may conform to the IEEE 802.11a Standard. In another embodiment, one or more of the network devices may conform to the IEEE 802.11g Standard. In still other embodiments, one or more of the network devices may conform to the IEEE 802.11n Standard. In various embodiments, various combinations of network devices conform to various combinations of the IEEE 802.11a/g/n Standards. In other embodiments, network devices conform to suitable communication protocols other than the protocols specified in the IEEE 802.11a/g/n Standards.

In some embodiments, a network device operating according to a first protocol (referred to herein as a "wide bandwidth protocol") and utilizing the second wider bandwidth transmits a packet according to a second protocol (referred to herein as a "narrow bandwidth protocol") in a first portion of the second bandwidth, wherein the first portion has the first bandwidth, and also simultaneously transmits a copy of the packet in a second portion of the second bandwidth, wherein the second portion also has the first bandwidth. This is useful, for example, when the network device is communicating with other devices that operate according to the narrow bandwidth protocol. Transmitting the packet in the first portion of the second bandwidth, and also simultaneously transmitting a copy of the packet in the second portion of the second bandwidth is sometimes referred to herein as transmitting a "duplicate narrow bandwidth packet."

In some embodiments, the wide bandwidth protocol is the protocol set forth in the IEEE 802.11n Standard, and the narrow bandwidth protocol is the protocol set forth in the IEEE 802.11a Standard or the protocol set forth in the IEEE 802.11g Standard. In other embodiments, the wide bandwidth protocol and the narrow bandwidth protocol are other suitable protocols.

Other devices in the WLAN that operate according to the wide bandwidth protocol receive the transmission of the duplicate narrow bandwidth packet. These devices determine whether the transmission corresponds to a single packet according to the wide bandwidth protocol or a duplicate narrow bandwidth packet. Embodiments of techniques for determining whether a transmission corresponds to a single packet according to the wide bandwidth protocol or a duplicate narrow bandwidth packet are described below.

Figure 1:
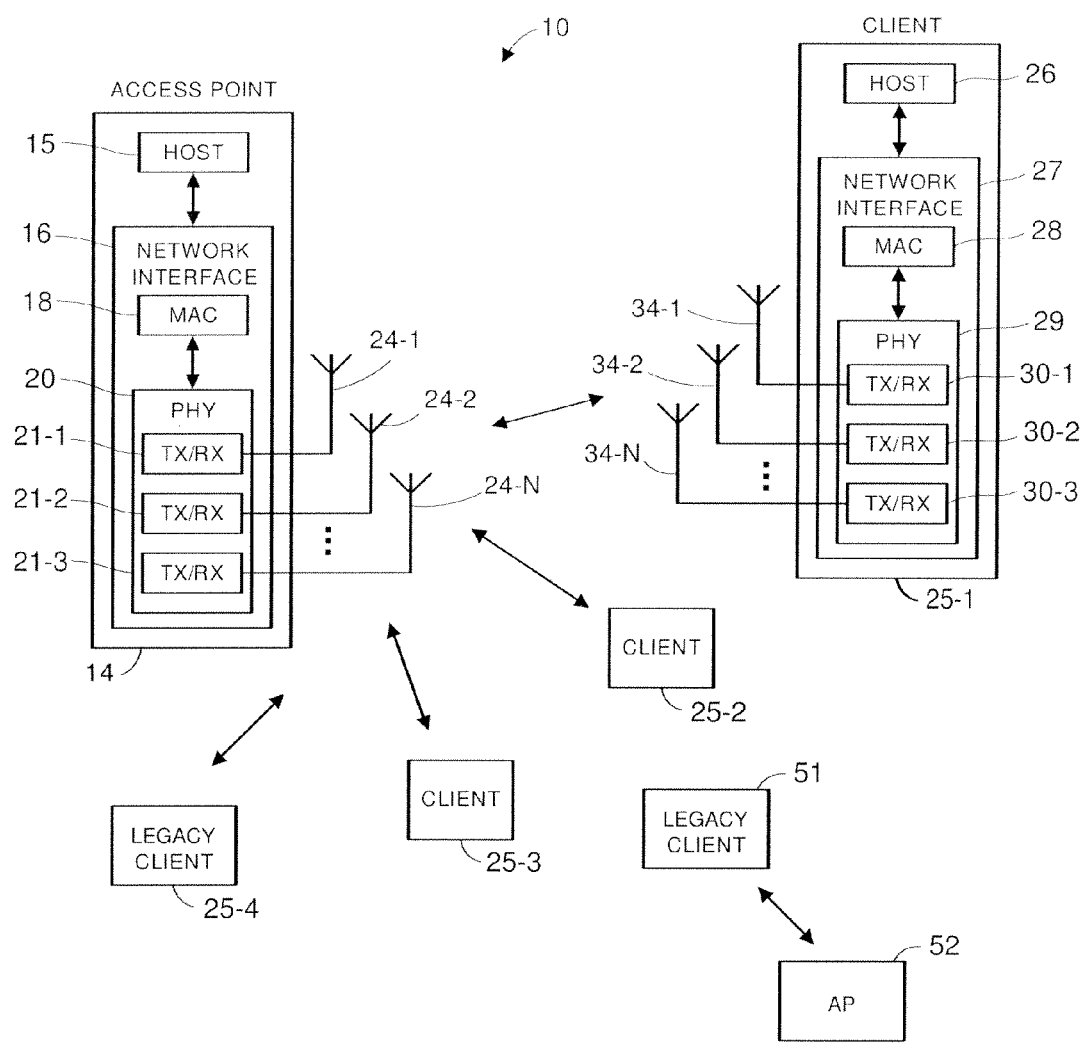
FIG. 1 is a block diagram of an example wireless local area network (WLAN) communication system in which network devices detect packets received via a communication channel, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 and the number of transceivers 21 need not be the same as the number of antennas 24, in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 and the number of transceivers 30 need not be the same as the number of antennas, in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

In an embodiment, the operation of AP 14 and the client stations 25-1, 25-2 and 25-3 conforms to the wide bandwidth protocol (e.g., the IEEE 802.11 n Standard based communication protocol or another suitable protocol). In this embodiment, the AP 14 transmits data packets to client station 25-1 via a wide bandwidth (e.g., 40 MHz or another suitable bandwidth) communication channel. In an embodiment, the wide bandwidth communication channel (e.g., 40 MHz wide) comprises a first bandwidth portion (e.g., 20 MHz wide) and a second bandwidth portion (e.g., 20 MHz wide).

In an embodiment, the client device 25-4 is configured to operate according to the narrow bandwidth protocol (e.g., the IEEE 802.11 a Standard based communication protocol, the IEEE 802.11 g Standard based communication protocol, or another suitable protocol) but not the wide bandwidth protocol (and is referred to herein as a "legacy client device" for ease of explanation). The AP 14 transmits data packets to the legacy client station 25-4 via a narrow bandwidth channel (e.g., a 20 MHz wide communication channel), in an embodiment.

In some scenarios, the AP 14 transmits a duplicate narrow bandwidth packet. The legacy client 25-4 is configured to receive and decode signals included in the first bandwidth portion or the second bandwidth portion, but not both, of the wide bandwidth communication channel. Because the duplicate narrow bandwidth packet includes a packet according to the narrow bandwidth protocol in the first bandwidth portion and a duplicate of the packet in the second bandwidth portion, the legacy client 25-4 is able to receive and decode the packet within the narrow bandwidth packet whether the legacy client 25-4 is tuned to the first bandwidth portion or the second bandwidth portion.

The client devices 25-1, 25-2, and 25-3 also receive the transmission of the duplicate narrow bandwidth packet transmitted by the AP 14. Each client 25-1, 25-2, and 25-3 determines whether the transmission is a packet according to the wide bandwidth protocol or a duplicate narrow bandwidth packet using techniques such as described below, in some embodiments.

Similarly, in some embodiments and scenarios, one of the client devices 25-1, 25-2, and 25-3 transmits a duplicate narrow bandwidth packet. The legacy client 25-4 is able to receive and decode the packet within the narrow bandwidth packet whether the legacy client 25-4 is tuned to the first bandwidth portion or the second bandwidth portion.

The other ones of the client devices 25-1, 25-2, and 25-3 and the AP 14 also receive the transmission of the duplicate narrow bandwidth packet. The other ones of the client devices 25-1, 25-2, and 25-3 and the AP 14 determine whether the transmission is a packet according to the wide bandwidth protocol or a duplicate narrow bandwidth packet using techniques such as described below, in some embodiments.

Figure 2A:
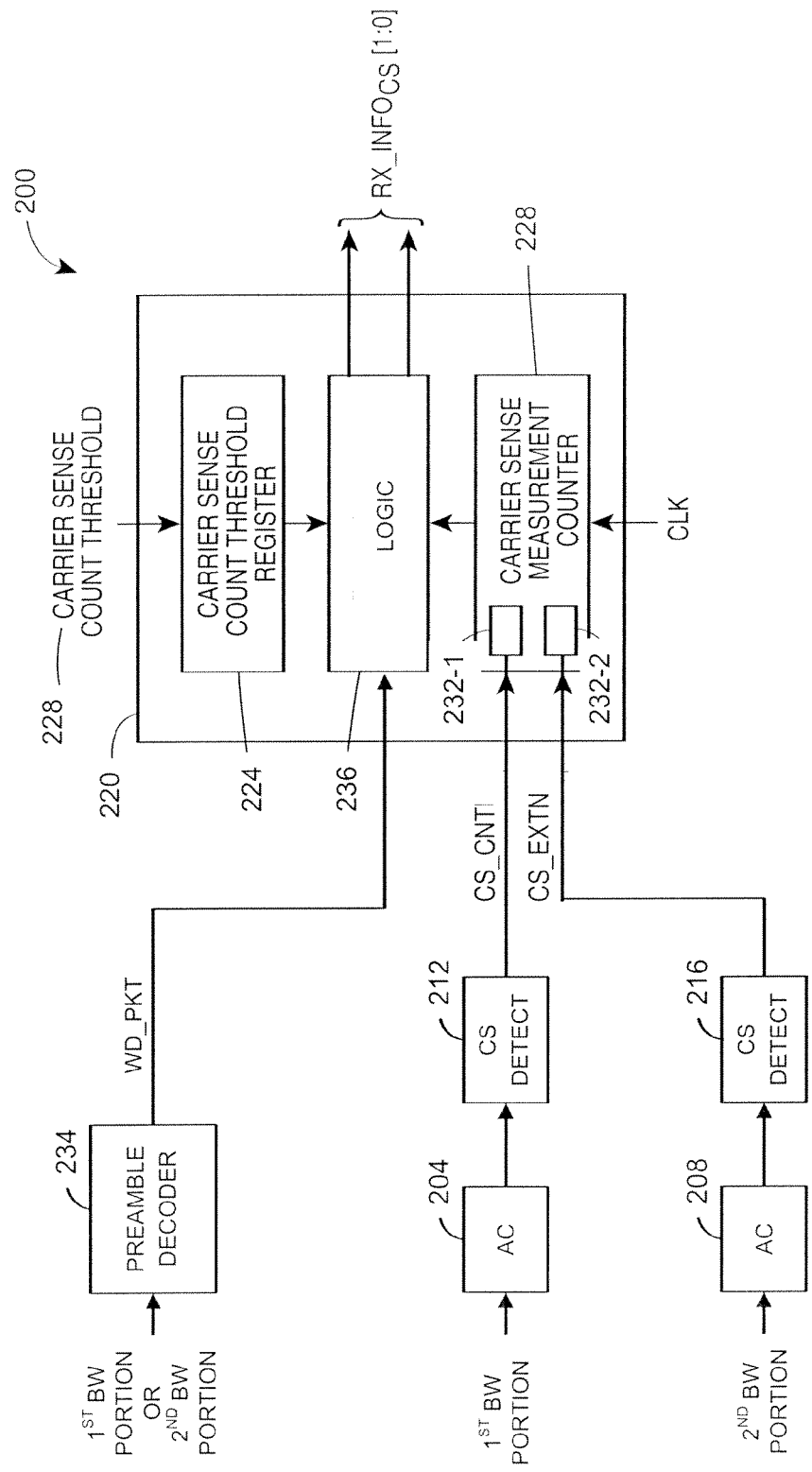
FIG. 2A is block diagram of an example packet assessment processor that utilizes carrier sense indication assess the bandwidth of a received packet, according to an embodiment.

FIG. 2A is a diagram of an example packet assessment processor 200 for determining whether a transmission corresponds to a duplicate narrow bandwidth packet, according to an embodiment. The packet assessment processor 200 is included in a PHY processing unit such as the PHY processing unit 20 and/or the PHY processing unit 29 (FIG. 1), in an embodiment.

The packet assessment processor 200 includes an autocorrelator 204 to process a signal corresponding to the first bandwidth portion in a received signal. The packet assessment processor 200 also includes an autocorrelator 208 to process a signal corresponding to the second bandwidth portion in a received signal. In the IEEE 802.11a/g/n Standards, a data unit includes begins in time with preamble, and more particularly begins in time with a synchronization field (e.g., a short training field (STF)) which is a periodic sequence comprising 10 periods, in which each period has a length of 0.8 microseconds (μs). Thus, an autocorrelation of a signal including the STF will tend to rise and plateau for approximately 0.8 μs, and this behavior can be utilized to help detect a data unit. In particular, an output of the autocorrelator 204 is utilized to detect an STF in the first bandwidth portion of the received signal, and an output of the autocorrelator 208 is utilized to detect an STF in the second bandwidth portion of the received signal.

A carrier sense (CS) detection unit 212 is coupled to the autocorrelator 204, and a CS detection unit 216 is coupled to the autocorrelator 208. In an embodiment, the CS detection unit 212 determines if the output of the autocorrelator 204 exceeds a first autocorrelation level threshold and generates an indicator signal CS_CNTL based on whether the output of the autocorrelator 204 exceeds the first autocorrelation level threshold. In an embodiment, the CS detection unit 216 determines if the output of the autocorrelator 208 exceeds a second autocorrelation level threshold and generates an indicator signal CS_EXTN based on whether the output of the autocorrelator 208 exceeds the second autocorrelation level threshold. In an embodiment, the first autocorrelation level threshold and the second autocorrelation level threshold are the same value. In an embodiment in which the first autocorrelation level threshold and the second autocorrelation level threshold are the same value, the value of the first/second autocorrelation level threshold is configurable. In another embodiment, the first autocorrelation level threshold and the second autocorrelation level threshold are different and/or the values of the first autocorrelation level threshold and the second autocorrelation level threshold are separately configurable.

The packet assessment processor 200 also includes a packet type detector 220, which includes a CS count threshold register 224 or other suitable storage device. The packet assessment processor 200 receives a CS count threshold value 228 which is stored in the CS count threshold register 224. In an embodiment, the carrier sense count threshold value 228 corresponds to a duration of the STF or another suitable value.

The packet assessment processor 200 also includes a carrier sense measurement counter unit 228 coupled to the CS detection unit 216 and the CS detection unit 220. The carrier sense measurement counter unit 228 comprises counters 232-1 and 232-2. The counter 232-1 counts a duration of a period in which the CS_CNTL indicates detection of an STF in the first bandwidth portion. Similarly, the 232-2 counts a duration of a period in which the CS_EXTN indicates detection of an STF in the second bandwidth portion.

In an embodiment, counters 232-1 and 232-2 receive a clock signal (CLK. In an embodiment, CLK has a clock period of 0.1 μsec (i.e. 10 MHz frequency). The sensitivity of measurements described below is increased in other embodiments by increasing the frequency of the clock signal 212. Similarly, the sensitivity of measurements described below is decreased in other embodiments by decreasing the frequency of the clock signal CLK.

In an embodiment, the counter 232-1 is incremented at a rate corresponding to the clock signal CLK when the CS_CNTL indicates detection of an STF in the first bandwidth portion. The counter 232-1 stops incrementing when the CS_CNTL no longer indicates detection of an STF in the first bandwidth portion. The counter 232-2 is incremented at the rate corresponding to the clock signal CLK when the CS_EXTN indicates detection of an STF in the second bandwidth portion. The counter 232-2 stops incrementing when the CS_EXTN no longer indicates detection of an STF in the second bandwidth portion.

Several illustrative examples are described below in the context of the IEEE 802.11a/g/n Standards. In other embodiments, other suitable communication protocols are utilized.

In a first example, a packet is received in a 20 MHz wide primary portion (CNTL) of a 40 MHz communication channel, and no signal is received in a 20 MHz wide secondary portion (EXTN) of the 40 MHz communication channel. In this example, the CS_CNTL indication will indicate detection of an STF in the primary portion (CNTL). On the other hand, the CS_EXTN indication will not indicate detection of an STF in the secondary portion (EXTN) because there is not a packet transmitted in the secondary portion (EXTN). The counter 232-1 increments, whereas the counter 232-2 will not increment. At the end of the STF of the received packet, the counter 232-1 will stop incrementing.

In another example, a packet is received in a 20 MHz wide secondary portion (EXTN) of a 40 MHz communication channel, and no signal is received in a 20 MHz wide primary portion (CNTL) of the 40 MHz communication channel. In this example, the CS_EXTN indication will indicates detection of an STF in the secondary portion (EXTN) when the STF of the packet is received. On the other hand, the CS_CNTL indication will not indicate detection of an STF in the primary portion (CNTL) because there is not a packet transmitted in the primary portion (CNTL). The counter 232-2 increments, whereas the counter 232-1 will not increment. At the end of the STF of the received packet, the counter 232-2 will stop incrementing.

In another example, a 40 MHz wide packet is received in the 40 MHz communication channel according to the wide bandwidth protocol. In this example, the CS_CNTL indication will indicate detection of an STF in the primary portion, and the CS_EXTN indication will indicate detection of an STF in the secondary portion. Both of the counters 232 increment, and at the end of the STF of the received packet, the counters 232 will stop incrementing and will end at the same or a similar count value.

In another example, a 40 MHz wide duplicate narrow bandwidth packet is received in the 40 MHz communication channel. In this example, the CS_CNTL indication will indicate detection of an STF in the primary portion, and the CS_EXTN indication will indicate detection of an STF in the secondary portion. Both of the counters 232 increment, and at the end of the STF of the received packet, the counters 232 will stop incrementing and will end at the same or a similar count value.

In other embodiments, the carrier sense measurement counter unit 230 comprises a single counter 232. In this embodiment, the single counter 232 increments only when both indications CS_EXTN and CS_CNTL 208 indicate detection of an STF in the first bandwidth portion and detection of an STF in the second bandwidth portion.

The packet type detector 220 is coupled to a preamble decoder 234 configured to decode at least a portion of a packet preamble formatted according to the wide bandwidth protocol, and to determine whether data in the portion of the preamble indicates that the packet is a single packet that occupies both the first bandwidth portion and the second bandwidth portion according to the wide bandwidth protocol. The preamble decoder 234 generates a signal WD_PKT that indicates that data in the portion of the preamble of the packet indicates that the packet is a single packet that occupies both the first bandwidth portion and the second bandwidth portion according to the wide bandwidth protocol. For example, in an embodiment in which the wide bandwidth protocol is the IEEE 802.11n Standard, the preamble decoder 234 is configured to decode the high throughput signal field (HT-SIG) and determine whether the CBW 20/40 bit of HT-SIG indicates the packet is a 40 MHz bandwidth packet. In an embodiment, the preamble decoder 234 is configured to determine whether the data in the portion of the preamble is valid and to generate the WD_PKT further based on whether the data in the portion of the preamble is valid. For example, in an embodiment in which the wide bandwidth protocol is the IEEE 802.11n Standard, the preamble decoder 234 is configured to decode the HT-SIG, determine whether the HT-SIG passes a CRC check, and generate the based on whether the HT-SIG passes the CRC check.

The packet type detector 220 also includes logic 236 coupled to the carrier sense measurement counter unit 228 and to the preamble decoder 234. In an embodiment, the logic 236 compares the counter 232-1 and the counter 232-2 to the value in the carrier sense count threshold register 224 Based on the result of the comparison and the WD_PKT signal, the logic 236 generates an indication Rx_Info$_{CS}$ of a type of packet received via the first and a second bandwidth portions of the communication channel, in an embodiment.

Table 1 is a table of the RX_Info$_{CS}$ values generated by the logic 236 based on the type of packet received in an embodiment in which the wide bandwidth protocol is the IEEE 802.11n Standard.

TABLE 1

| Type and number of packets received via 40 MHz communication channel | RX_Info$_{CS}$ value |
|---|---|
| Single packet received via 20 MHz primary channel | 0 |
| Single packet received via 20 MHz secondary channel | 1 |
| Single packet received via 40 MHz channel | 2 |
| Duplicate packet received via 20 MHz primary and secondary channel | 3 |

In an embodiment, the packet type detector 220 generates an RX_Info$_{CS}$ value corresponding to 00 if counter 232-1 exceeds the carrier sense count threshold value in register 224 and if counter 232-2 does not exceed the carrier sense count threshold in register 224. The packet type detector 220 generates an RX_Info$_{CS}$ value corresponding to 01 if counter 232-1 does not exceed the value of carrier sense count threshold register 224 and if the counter 232-2 exceeds the value of the carrier sense count threshold register 224. In an embodiment, packet type detector 220 generates an RX_Info$_{CS}$ value corresponding to 11 if counter 232-1 and counter 232-2 both exceed the carrier sense count threshold value in the register 224 and WD_PKT does not indicate that the packet is a single packet that occupies both the first bandwidth portion and the second bandwidth portion. The packet type detector 220 generates an RX_Info$_{CS}$ value corresponding to 10 if the counter 232-1 and counter 232-2 exceed the value in the carrier sense count threshold register 224 and WD_PKT indicates that the packet is a single packet that occupies both the first bandwidth portion and the second bandwidth portion, in an embodiment.

In an embodiment, the logic 236 is configured to generate an indicator (CS_CNTL_DETECT) of when the counter 232-1 exceeds the value in the CS count threshold register 224. In an embodiment, the logic 236 is configured to generate an indicator (CS_EXTN_DETECT) of when the counter 232-2 exceeds the value in the CS count threshold register 224. In an embodiment, the logic 236 is configured to generate RX_Info$_{CS}$ based on CS_CNTL_DETECT and CS_EXTN_DETECT.

In other embodiments, additional autocorrelation and CS detection unit(s) corresponding to additional bandwidth portion(s) (e.g., a tertiary portion, a quaternary portion, etc.) when a packet according to the narrow bandwidth protocol is duplicated in multiple bandwidth portions. In these embodiments, the carrier sense measurement counter unit 228 receives indication(s) for detection(s) of preambles received via further bandwidth portion(s). In an embodiment, logic 236 compares values of more than two counters to the value in the in the carrier sense count threshold register 224 to determine if a duplicate narrow bandwidth packet was received. In another embodiment, the logic 236 compares a value of single counter to the value in the carrier sense count threshold register 224 to determine if a duplicate narrow bandwidth packet was received.

Figure 2B:
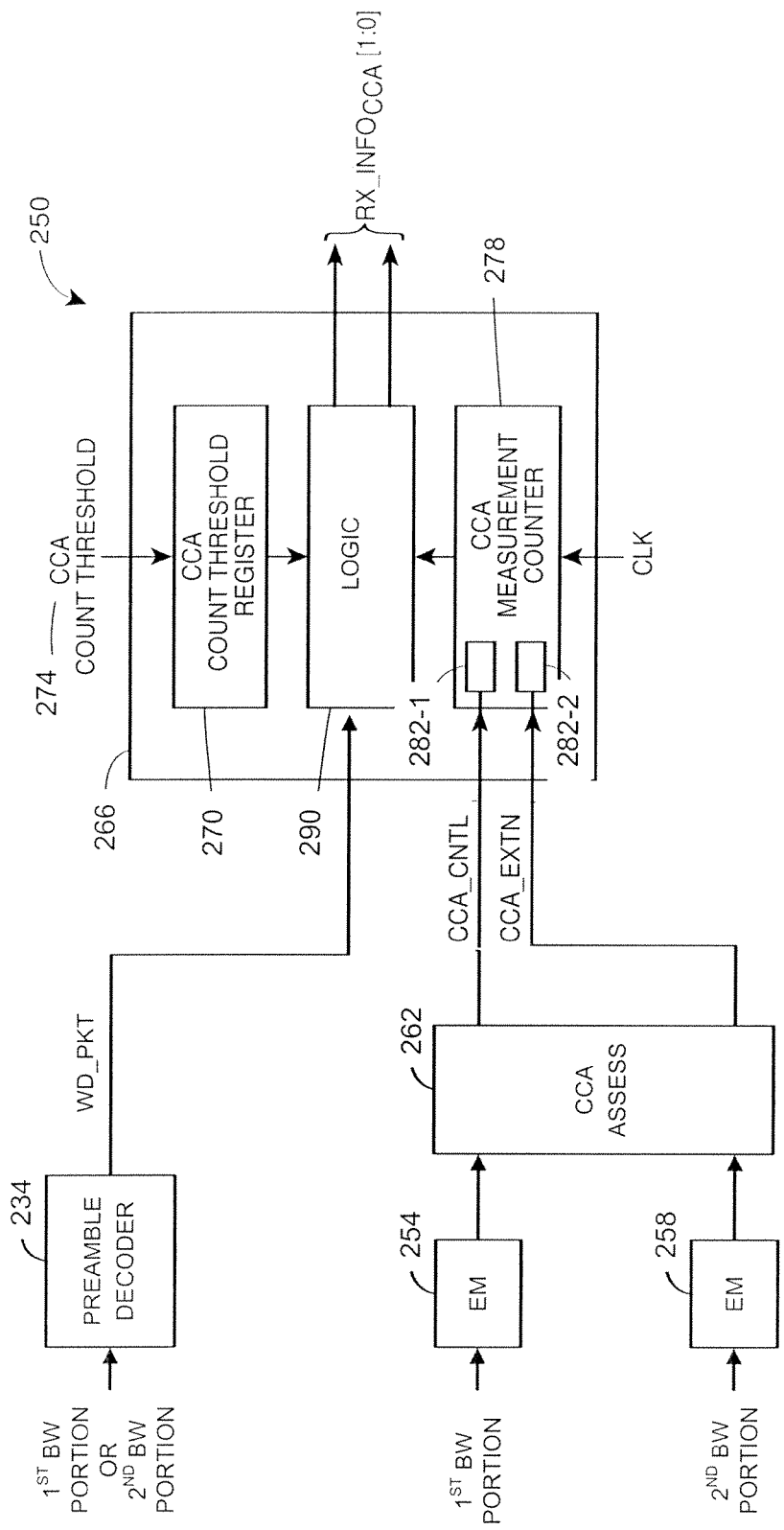
FIG. 2B is block diagram of another example packet assessment processor that utilizes clear channel assessment to assess the bandwidth of a received packet, according to another embodiment.

FIG. 2B is a diagram of another example packet assessment processor 250 for determining whether a transmission corresponds to a duplicate narrow bandwidth packet, according to another embodiment. The packet assessment processor 250 is included in a PHY processing unit such as the PHY processing unit 20 and/or the PHY processing unit 29 (FIG. 1), in an embodiment.

The packet assessment processor 250 includes a signal energy measurement unit 254 to measure signal energy in a signal corresponding to the first bandwidth portion in a received signal. The packet assessment processor 250 also includes a signal energy measurement unit 258 to measure signal energy in a signal corresponding to the second bandwidth portion in a received signal. Measured signal energy in a bandwidth portion will tend to rise and plateau while a signal is transmitted in the bandwidth portion. Thus, an output of the signal energy measurement unit 254 is utilized to detect a packet transmitted in the first bandwidth portion of the received signal, and an output of the signal energy measurement unit 258 is utilized to detect a packet transmitted in the second bandwidth portion of the received signal.

A clear channel assessment (CCA) unit 262 is coupled to the signal energy measurement unit 254 and the signal energy measurement unit 258. In an embodiment, the CCA unit 262 determines if the output of the signal energy measurement unit 254 exceeds a first energy level threshold and generates an indicator signal CCA_CNTL based on whether the output of the signal energy measurement unit 254 exceeds the first energy level threshold. In an embodiment, the CCA unit 262 determines if the output of the signal energy measurement unit 258 exceeds a second energy level threshold and generates an indicator signal CCA_EXTN based on whether the output of the signal energy measurement unit 258 exceeds the second energy level threshold. In an embodiment, the first energy level threshold and the second energy level threshold are the same value. In an embodiment in which the first energy level threshold and the second energy level threshold are the same value, the value of the first/second energy level threshold is configurable. In another embodiment, the first energy level threshold and the second energy level threshold are different and/or the values of the first energy level threshold and the second energy level threshold are separately configurable.

The packet assessment processor 250 also includes a packet type detector 266, which includes CCA count threshold register 270 or other suitable storage device. The packet assessment processor 250 receives a CCA count threshold value 274 which is stored in the CCA count threshold register 270. In an embodiment, the CCA count threshold value 274 corresponds to a duration of the STF or another suitable value.

The packet assessment processor 266 also includes a CCA measurement counter unit 278 coupled to the CCA detection unit 262. The CCA measurement counter unit 278 comprises counters 282-1 and 282-2. The counter 282-1 counts a duration of a period in which the CCA_CNTL indicates that the output of the signal energy measurement unit 254 exceeds the first energy level threshold. Similarly, the counter 282-2 counts a duration of a period in which the CCA_EXTN indicates that the output of the signal energy measurement unit 258 exceeds the second energy level threshold.

In an embodiment, counters 282-1 and 282-2 receive a clock signal (CLK). In an embodiment, CLK has a clock period of 0.1 μsec (i.e. 10 MHz frequency). The sensitivity of measurements described below is increased in other embodiments by increasing the frequency of the clock signal CLK. Similarly, the sensitivity of measurements described below is decreased in other embodiments by decreasing the frequency of the clock signal CLK.

In an embodiment, the counter 282-1 is incremented at a rate corresponding to the clock signal CLK when the CCA_CNTL indicates that the output of the signal energy measurement unit 254 exceeds the first autocorrelation level threshold. The counter 282-1 stops incrementing when the CCA_CNTL no longer indicates that the output of the signal energy measurement unit 254 exceeds the first energy level threshold. The counter 282-2 is incremented at the rate corresponding to the clock signal CLK when the CCA_EXTN indicates that the output of the signal energy measurement unit 258 exceeds the second energy level threshold. The counter 282-2 stops incrementing when the CCA_EXTN no longer indicates that the output of the signal energy measurement unit 258 exceeds the second energy level threshold.

Several illustrative examples are described below in the context of the IEEE 802.11a/g/n Standards. In other embodiments, other suitable communication protocols are utilized.

In a first example, a packet is received in a 20 MHz wide primary portion (CNTL) of a 40 MHz communication channel, and no signal is received in a 20 MHz wide secondary portion (EXTN) of the 40 MHz communication channel. In this example, the CCA_CNTL indication will indicate detection of a packet in the primary portion (CNTL). On the other hand, the CCA_EXTN indication will not indicate detection of a packet in the secondary portion (EXTN) because there is not a packet transmitted in the secondary portion (EXTN). The counter 282-1 increments, whereas the counter 282-2 will not increment. When the CCA_CNTL no longer indicates a packet, the counter 282-1 stops incrementing.

In another example, a packet is received in a 20 MHz wide secondary portion (EXTN) of a 40 MHz communication channel, and no signal is received in a 20 MHz wide primary portion (CNTL) of the 40 MHz communication channel. In this example, the CCA_EXTN indication will indicates detection of a packet in the secondary portion (EXTN) when the packet is received. On the other hand, the CCA_CNTL indication will not indicate detection of a packet because there is not a packet transmitted in the primary portion (CNTL). The counter 282-2 increments, whereas the counter 282-1 will not increment. When the CCA_EXTN no longer indicates a packet, the counter 282-2 stops incrementing.

In another example, a 40 MHz wide packet is received in the 40 MHz communication channel according to the wide bandwidth protocol. In this example, the CCA_CNTL indication will indicate detection of a packet in the primary portion, and the CCA_EXTN indication will indicate detection of a packet in the secondary portion. Both of the counters 282 increment. When the CCA_CNTL and CCA_EXTN no longer indicate a packet, the counters 282 stop incrementing.

In another example, a 40 MHz wide duplicate narrow bandwidth packet is received in the 40 MHz communication channel. In this example, the CCA_CNTL indication will indicate detection of a packet in the primary portion, and the CCA_EXTN indication will indicate detection of a packet in the secondary portion. Both of the counters 282 increment. When the CCA_CNTL and CCA_EXTN no longer indicate a packet, the counters 282 stop incrementing.

In other embodiments, the CCA measurement counter unit 278 comprises a single counter 282. In this embodiment, the single counter 282 increments only when both indications CCA_EXTN and CCA_CNTL indicate detection of a packet in the first bandwidth portion and detection of a packet in the second bandwidth portion.

The packet type detector 266 is coupled to the preamble decoder 234 discussed above with respect to FIG. 2A.

The packet type detector 266 also includes logic 290 coupled to the CCA measurement counter unit 278 and to the preamble decoder 234. In an embodiment, the logic 290 compares the counter 282-1 and the counter 282-2 to the value in the CCA count threshold register 270. Based on the result of the comparison and the WD_PKT signal, the logic 290 generates an indication $Rx\_Info_{CCA}$ of a type of packet via the first and a second bandwidth portions of the communication channel, in an embodiment.

Table 2 is a table of the $RX\_Info_{CCA}$ values generated by the logic 236 based on the type of packet received, in an embodiment in which the wide bandwidth protocol is the IEEE 802.11n Standard.

TABLE 2

| Type and number of packets received via 40 MHz communication channel | $RX\_Info_{CCA}$ value |
|---|---|
| Single packet received via 20 MHz primary channel | 0 |
| Single packet received via 20 MHz secondary channel | 1 |
| Single packet received via 40 MHz channel | 2 |
| Duplicate packet received via 20 MHz primary and secondary channel | 3 |

In an embodiment, the logic 290 generates an $RX\_Info_{CCA}$ value corresponding to 00 if counter 282-1 exceeds the CCA count threshold value in register 270 and if counter 282-2 does not exceed the CCA count threshold in register 270. The logic 290 generates an $RX\_Info_{CCA}$ value corresponding to 01 if counter 282-1 does not exceed the value of CCA count threshold register 270 and if the counter 282-2 exceeds the value of the CCA count threshold register 270. In an embodiment, the logic 290 generates an $RX\_Info_{CCA}$ value corresponding to 11 if counter 282-1 and counter 282-2 both exceed the CCA count threshold value in the register 270 and WD_PKT does not indicate that the packet is a single packet that occupies both the first bandwidth portion and the second bandwidth portion. The logic 290 generates an $RX\_Info_{CCA}$ value corresponding to 10 if the counter 282-1 and counter 282-2 exceed the value in the CCA count threshold register 270 and WD_PKT indicates that the packet is a single packet that occupies both the first bandwidth portion and the second bandwidth portion, in an embodiment.

In an embodiment, the logic 290 is configured to generate an indicator (CCA_CNTL_DETECT) of when the counter 282-1 exceeds the value in the CCA count threshold register 270. In an embodiment, the logic 290 is configured to generate an indicator (CCA_EXTN_DETECT) of when the counter 282-2 exceeds the value in the CCA count threshold register 270. In an embodiment, the logic 290 is configured to generate $RX\_Info_{CCA}$ based on CCA_CNTL_DETECT and CCA_EXTN_DETECT.

In other embodiments, additional signal energy measurement unit(s) corresponding to additional bandwidth portion(s) (e.g., a tertiary portion, a quaternary portion, etc.) when a packet according to the narrow bandwidth protocol is duplicated in multiple bandwidth portions. In these embodiments, the CCA unit 262 is coupled to the additional signal energy measurement unit(s), and generates additional CCA indicator signal(s) for the additional bandwidth portion(s). The carrier sense measurement counter unit 278 receives indication(s) for detection(s) of a packet received via further bandwidth portion(s). In an embodiment, the logic 290 compares values of more than two counters to the value in the in the CCA count threshold register 270 to determine if a duplicate narrow bandwidth packet was received. In another embodiment, the logic 290 compares a value of single counter to the value in the CCA count threshold register 270 to determine if a duplicate narrow bandwidth packet was received.

Figure 2C:
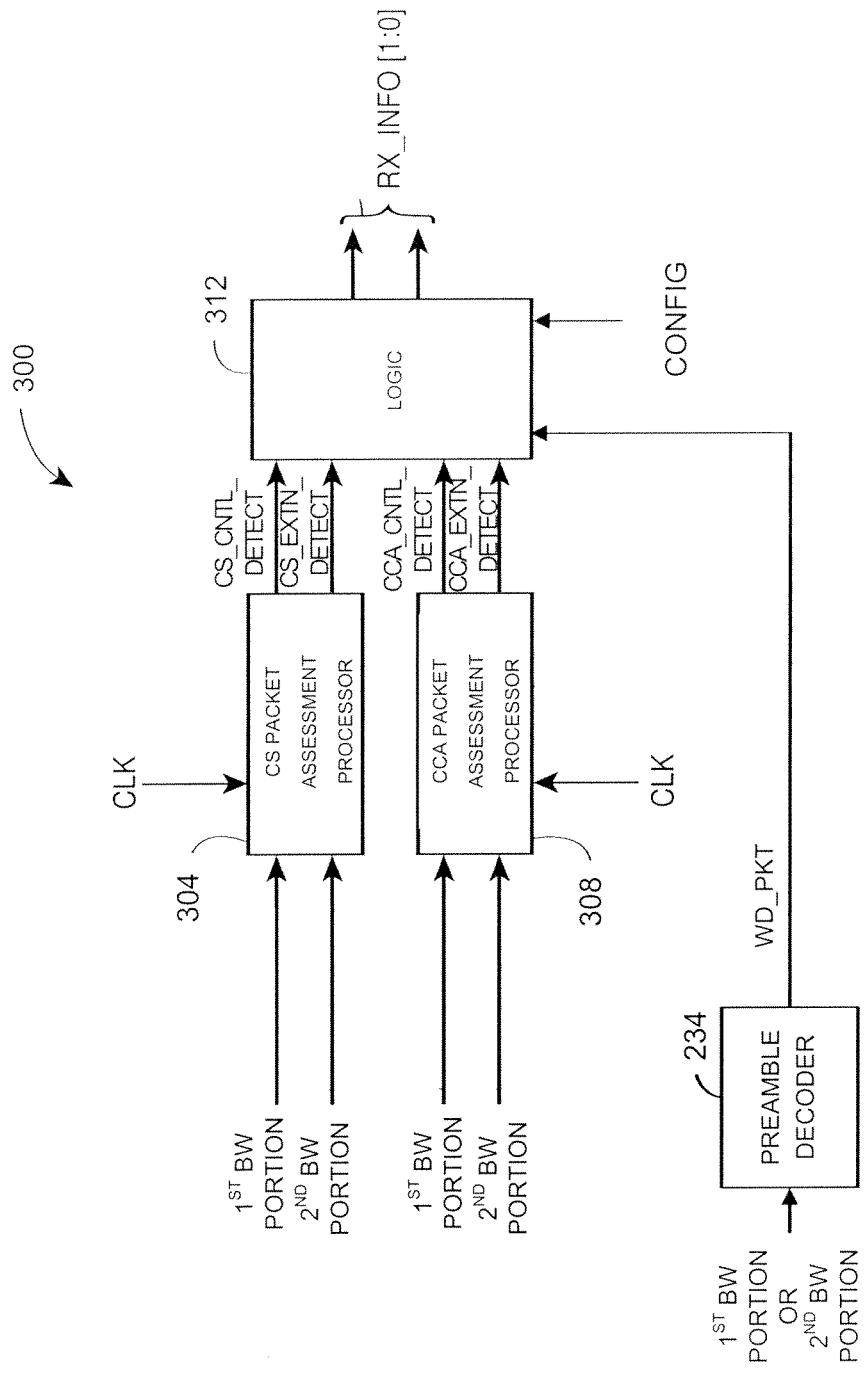
FIG. 2C is a block diagram of an example packet assessment processor that utilizes clear channel assessment and carrier sense to assess the bandwidth of a received packet, according to an embodiment.

FIG. 2C is a diagram of another example packet assessment processor 300, according to another embodiment. The packet assessment processor 300 is included in a PHY processing unit such as the PHY processing unit 20 and/or the PHY processing unit 29 (FIG. 1), in an embodiment. The packet assessment processor 300 comprises a CS packet assessment processor 304. In an embodiment, the CS packet assessment processor 304 is similar to the packet assessment processor 200 of FIG. 2A, and the CS packet assessment processor 304 is configured to generate the CS_CNTL_DETECT and CS_EXTN_DETECT signals as discussed above. In an embodiment, the CS packet assessment processor 304 is not configured to generate RX_Info$_{CS}$ and is not configured to utilize the WD_PKT signal from the preamble decoder 234.

The packet assessment processor 300 also comprises a CCA packet assessment processor 308. In an embodiment, the CCA packet assessment processor 308 is similar to the packet assessment processor 250 of FIG. 2B, and the CCA packet assessment processor 308 is configured to generate the CCA_CNTL_DETECT and CCA_EXTN_DETECT signals as discussed above. In an embodiment, the CCA packet assessment processor 308 is not configured to generate RX_Info$_{CCA}$ and is not configured to utilize the WD_PKT signal from the preamble decoder 234.

The packet assessment processor 300 also comprises logic 312 coupled to the CS packet assessment processor 304 and the CCA packet assessment processor 308. The logic 312 receives the CS_CNTL_DETECT and CS_EXTN_DETECT signals from the CS packet assessment processor 304 and the CCA_CNTL_DETECT and CCA_EXTN_DETECT signals from the CCA packet assessment processor 308. The logic 312 also receives WD_PKT signal from the preamble decoder 234, in an embodiment.

In an embodiment, the logic 312 is configured to generate RX_Info values based on the type of packet received similar to the values in Table 1 and Table 2, in an embodiment in which the wide bandwidth protocol is the IEEE 802.11n Standard.

In an embodiment, the logic 312 is configured to generate RX_Info value corresponding to 00 if CS_CNTL_DETECT indicates a packet, CS_EXTN_DETECT does not indicate a packet, CCA_CNTL_DETECT indicates a packet, and CS_EXTN_DETECT does not indicate a packet. In an embodiment, the logic 312 is configured to generate RX_Info value corresponding to 01 if CS_CNTL_DETECT does not indicates a packet, CS_EXTN_DETECT indicates a packet, CCA_CNTL_DETECT does not indicate a packet, and CS_EXTN_DETECT indicates a packet. In an embodiment, the logic 312 is configured to generate RX_Info value corresponding to 11 if all of CS_CNTL_DETECT, CS_EXTN_DETECT, CCA_CNTL_DETECT, CS_CNTL_DETECT indicate a packet and WD_PKT does not indicate that the packet is a single packet that occupies both the first bandwidth portion and the second bandwidth portion. In an embodiment, the logic 312 is configured to generate RX_Info value corresponding to 10 if all of CS_CNTL_DETECT, CS_EXTN_DETECT, CCA_CNTL_DETECT, CS_CNTL_DETECT indicate a packet and WD_PKT indicates that the packet is a single packet that occupies both the first bandwidth portion and the second bandwidth portion, in an embodiment.

The logic 312 also receives configuration information, in an embodiment. In an embodiment, the logic 312 is configurable so that the logic 312 ignores CS information or ignores CCA information. For example, the logic 312 is configured in an embodiment, according to the configuration information, so that the logic 312 ignores CCA information and generates RX_Info value corresponding to 00 if CS_CNTL_DETECT indicates a packet, and CS_EXTN_DETECT does not indicate a packet; generates RX_Info value corresponding to 01 if CS_CNTL_DETECT does not indicates a packet, and CS_EXTN_DETECT indicates a packet; generates RX_Info value corresponding to 11 if both of CS_CNTL_DETECT and CS_EXTN_DETECT indicate a packet and WD_PKT does not indicate that the packet is a single packet that occupies both the first bandwidth portion and the second bandwidth portion; generates RX_Info value corresponding to 10 if both of CS_CNTL_DETECT and CS_EXTN_DETECT indicate a packet and WD_PKT indicates that the packet is a single packet that occupies both the first bandwidth portion and the second bandwidth portion, in an embodiment.

As another example, the logic 312 is configured in an embodiment, according to the configuration information, so that the logic 312 ignores CS information and generates RX_Info value corresponding to 00 if CCA_CNTL_DETECT indicates a packet, and CCA_EXTN_DETECT does not indicate a packet; generates RX_Info value corresponding to 01 if CCA_CNTL_DETECT does not indicates a packet, and CCA_EXTN_DETECT indicates a packet; generates RX_Info value corresponding to 11 if both of CCA_CNTL_DETECT and CCA_EXTN_DETECT indicate a packet and WD_PKT does not indicate that the packet is a single packet that occupies both the first bandwidth portion and the second bandwidth portion; generates RX_Info value corresponding to 10 if both of CCA_CNTL_DETECT and CCA_EXTN_DETECT indicate a packet and WD_PKT indicates that the packet is a single packet that occupies both the first bandwidth portion and the second bandwidth portion, in an embodiment.

In other embodiments, the logic 312 is not configurable to ignore CS information or CCA information.

Figure 3:
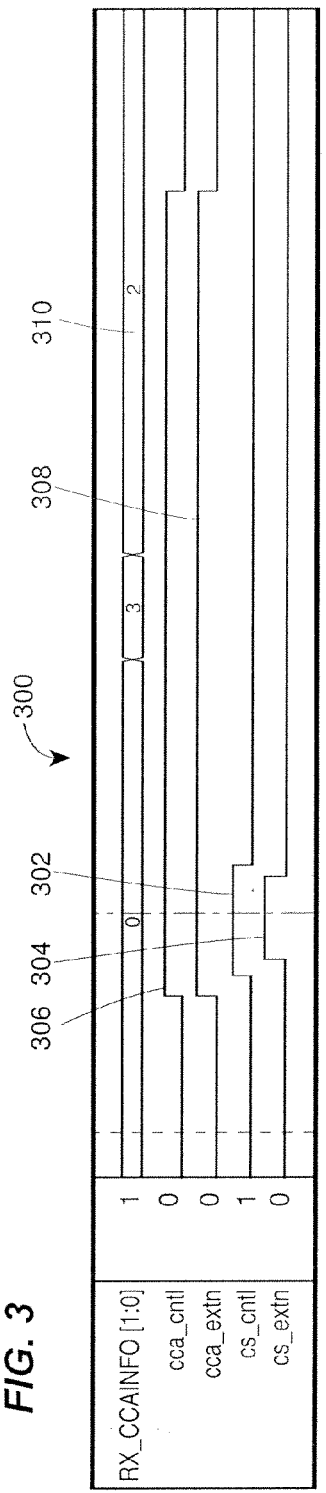
FIG. 3 is a timing diagram for an example of generation of an indication of a packet type when a packet is received via a 40 MHz communication channel, according to an embodiment.
Figure 4:
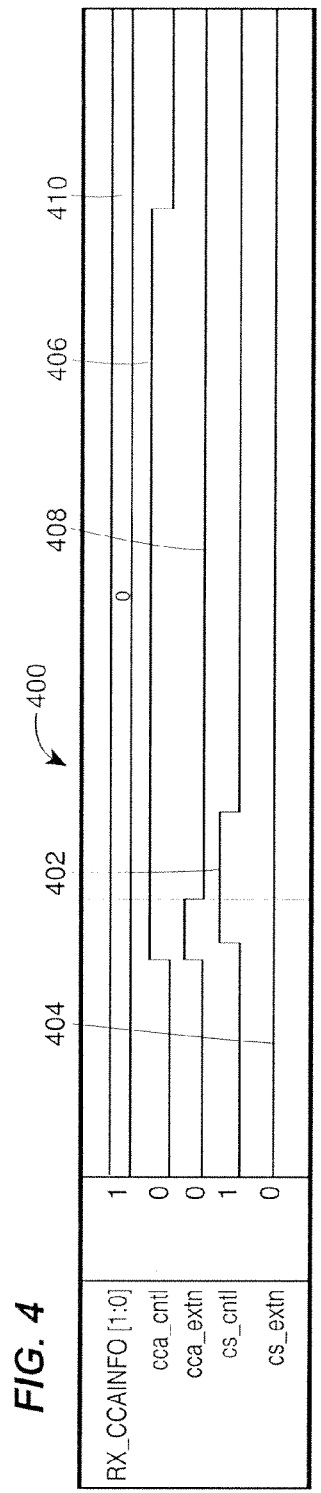
FIG. 4 is a timing diagram for another example of generation of an indication of a packet type when a duplicate packet is received via a first 20 MHz bandwidth portion and a second 20 MHz bandwidth portion of a 40 MHz communication channel, according to an embodiment.
Figure 5:
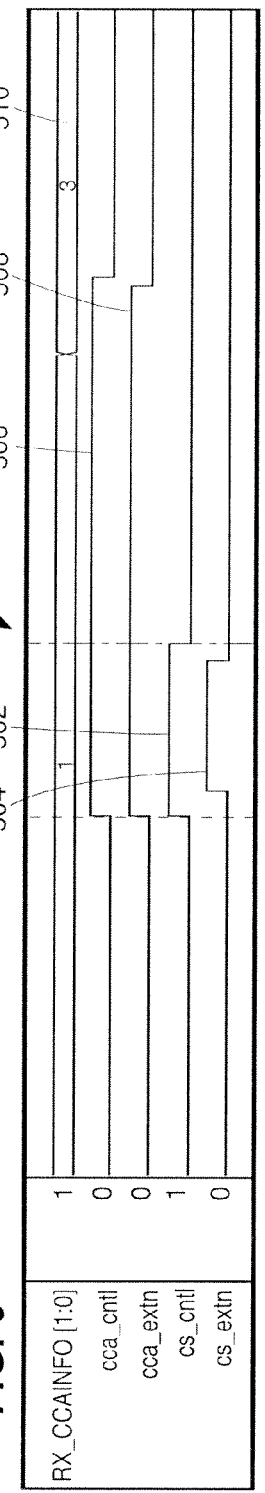
FIG. 5 is a timing diagram for another example of generation of an indication of a packet type when a packet is received via a first 20 MHz subchannel of a 40 MHz communication channel, according to an embodiment.

FIGS. 3-5 are timing diagrams corresponding to illustrative examples for an embodiment in which the wide bandwidth protocol is the IEEE 802.11n Standard. For instance, FIG. 3 is a timing diagram for an example of generation of the RX_INFO[1:0] signals of FIG. 2C when a single 40 MHz wide IEEE 802.11n Standard packet is received via a 40 MHz communication channel. In this example, the CS_CNTL signal goes high at 302 for a time period roughly corresponding to the L-STF, and the CS_EXTN signal also goes high at 304 for a time period roughly corresponding to the L-STF. Additionally, CCA_CNTL signal goes high at 306 and the CCA_EXTN signal also goes high at 308. Eventually, the RX_Info signal changes to a value 3. When the WD_PKT indicates that the packet is a single packet 40 MHz wide packet, the RX_Info signal changes to a value 2.

FIG. 4 is a timing diagram for an example of generation of the RX_INFO[1:0] signals when a packet is received via a 20 MHz primary subchannel of a 40 MHz communication channel. In this example, the CS_CNTL signal goes high at 402 for a time period roughly corresponding to the L-STF, and the CS_EXTN remains low (404). Additionally, CCA_CNTL signal goes high at 406 and the CCA_EXTN signal goes high for a short time period, but then remains low (408). The RX_Info signal remains at 0.

FIG. 5 is a timing diagram for an example of generation of the RX_INFO[1:0] signals when a duplicate packet is received via a 20 MHz primary subchannel and a 20 MHz secondary subchannel. In this example, the CS_CNTL signal goes high at 502 for a time period roughly corresponding to the L-STF, and the CS_EXTN signal also goes high at 504 for a time period roughly corresponding to the L-STF. Additionally, CCA_CNTL signal goes high at 506 and the CCA_EXTN signal also goes high at 508. Eventually, the RX_Info signal changes to a value 3. The WD_PKT never indicates that the packet is a single packet 40 MHz wide packet, so the RX_Info signal remains at 3.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for detecting a duplicate packet in a signal, the method comprising;
    receiving the signal using a receiver;
    performing carrier sense (CS) operations on the received signal in at least each of two frequency bands;
    performing clear channel assessment (CCA) operations on the received signal in the at least each of two frequency bands;
    decoding a portion of a preamble in the received signal to determine whether the received signal corresponds to a single packet in the at least two frequency bands; and
    determining whether the received signal corresponds to a packet duplicated in the at least two frequency bands based on i) the CS operations, ii) the CCA operations, and iii) a determination whether the received signal corresponds to a single packet in the at least two frequency bands.

2. A method according to claim 1, wherein performing CS operations on the received signal comprises measuring a respective time duration for which a respective autocorrelation in each of the at least two frequency bands exceeds a first threshold.

3. A method according to claim 2, wherein performing CS operations on the received signal further comprises comparing the time durations to a second threshold.

4. A method according to claim 1, wherein performing CCA operations on the received signal comprises measuring a respective time duration for which respective measured energy in each of the at least two frequency bands exceeds a first threshold.

5. A method according to claim 4, wherein performing CCA operations on the received signal further comprises comparing the time durations to a second threshold.

6. A method according to claim 1, wherein each of the at least two frequency bands have a bandwidth of 20 MHz.

7. A method according to claim 1, wherein determining whether the received signal corresponds to a packet duplicated in the at least two frequency bands is performed with a logic device, and
    wherein the logic device is configurable so that determining whether a subsequently received signal corresponds to a packet duplicated in the at least two frequency bands is based on the CS operations and is not based on the CCA operations.

8. A method according to claim 1, wherein determining whether the received signal corresponds to a packet duplicated in the at least two frequency bands is performed with a logic device, and
    wherein the logic device is configurable so that determining whether a subsequently received signal corresponds to a packet duplicated in the at least two frequency bands is based on the CCA operations and is not based on the CS operations.

9. An apparatus for detecting a duplicate packet in a signal, the apparatus comprising;
    a carrier sense (CS) packet assessment processor to analyze a received signal in at least each of two frequency bands;
    a clear channel assessment (CCA) packet assessment processor to analyze the received signal in the at least each of two frequency bands;
    a preamble decoder to decode at least a portion of a preamble in the received signal to determine whether the received signal corresponds to a single packet in the at least two frequency bands; and
    a logic configured to determine whether the received signal corresponds to a packet duplicated in the at least two frequency bands based on i) outputs generated by the CS packet assessment processor, ii) outputs generated by the CCA packet assessment processor, and iii) an indicator of whether the received signal corresponds to a single packet in the at least two frequency bands.

10. An apparatus according to claim 9, wherein the CS packet assessment processor comprises:
    a first autocorrelator to generate a first autocorrelation of the received signal in a first frequency band;
    a second autocorrelator to generate a second autocorrelation of the received signal in a second frequency band;
    a first CS detection unit to generate a first CS detection signal based on whether the first autocorrelation exceeds a first threshold;
    a second CS detection unit to generate a second CS detection signal based on whether the second autocorrelation exceeds a second threshold; and a counter unit to measure i) a first duration of the first CS detection signal and ii) a second duration of the second CS detection signal.

11. An apparatus according to claim 10, wherein the CS packet assessment processor further comprises logic to determine i) if the first duration exceeds a CS count threshold and ii) if the second duration exceeds the CS count threshold.

12. An apparatus according to claim 9, wherein the CCA packet assessment processor comprises:
- a first energy measurement unit to generate a first energy measurement of the received signal in a first frequency band;
- a second energy measurement unit to generate a second energy measurement of the received signal in a second frequency band;
- a CCA assessment unit to i) generate a first CCA detection signal based on the first energy measurement and ii) generate a second CCA detection signal based on the second energy measurement; and
- a counter unit to measure i) a first duration of the first CCA detection signal and ii) a second duration of the second CCA detection signal.

13. An apparatus according to claim 12, wherein the CCA packet assessment processor further comprises logic to determine i) if the first duration exceeds a CCA count threshold and ii) if the second duration exceeds the CCA count threshold.

14. An apparatus according to claim 13, further comprising a memory device to store the CCA count threshold.

15. An apparatus according to claim 9, wherein each of the at least two frequency bands have a bandwidth of 20 MHz.

16. An apparatus according to claim 9, wherein the logic circuit configured to determine whether the received signal corresponds to a packet duplicated in the at least two frequency bands is reconfigurable to:
- determine whether the received signal corresponds to a packet duplicated in the at least two frequency bands based on outputs generated by the CS packet assessment processor and not based on outputs generated by the CCA packet assessment processor.

17. An apparatus according to claim 9, wherein the logic circuit configured to determine whether the received signal corresponds to a packet duplicated in the at least two frequency bands is reconfigurable to:
- determine whether the received signal corresponds to a packet duplicated in the at least two frequency bands based on outputs generated by the CCA packet assessment processor and not based on outputs generated by the CS packet assessment processor.

* * * * *